(12) United States Patent
Critelli et al.

(10) Patent No.: US 7,111,408 B2
(45) Date of Patent: Sep. 26, 2006

(54) FOLDING RULE

(75) Inventors: James M. Critelli, Fuquay-Varina, NC (US); Edgar T. Gilliam, Franklinton, NC (US)

(73) Assignee: Cooper Brands, Inc., Houston, TX (US)

( * ) Notice: Subject to any disclaimer, the term of this patent is extended or adjusted under 35 U.S.C. 154(b) by 1 day.

(21) Appl. No.: 11/050,614

(22) Filed: Feb. 2, 2005

(65) Prior Publication Data

US 2006/0168834 A1     Aug. 3, 2006

(51) Int. Cl.
B43L 7/10     (2006.01)
(52) U.S. Cl. .......................................... 33/458; 33/493
(58) Field of Classification Search .......... 33/458–461, 33/483, 493
See application file for complete search history.

(56) References Cited

U.S. PATENT DOCUMENTS

| | | | |
|---|---|---|---|
| 1,432,834 A | 10/1922 | Buck | |
| 1,460,784 A | 7/1923 | Buck | |
| 1,501,713 A * | 7/1924 | McCaffrey | 33/458 |
| 1,767,789 A * | 6/1930 | Garbs | 33/458 |
| 1,978,887 A | 10/1934 | Stowell | |
| 1,998,018 A | 4/1935 | Kadu | |
| 2,478,198 A * | 8/1949 | Kroener | 33/458 |
| 2,555,741 A | 6/1951 | Greene | |
| 2,607,995 A * | 8/1952 | Butler | 33/458 |
| 2,642,667 A | 6/1953 | Smiley | |
| 2,669,026 A | 2/1954 | Doerr | |
| 2,842,850 A | 7/1958 | Anderson et al. | |
| 3,003,244 A | 10/1961 | Fogliano | |
| 3,289,302 A | 12/1966 | Quenot | |
| 3,490,148 A | 1/1970 | Mathes | |
| 4,073,205 A | 2/1978 | Silliman | |
| 4,203,227 A | 5/1980 | Giroux | |
| 4,426,790 A * | 1/1984 | Kimel | 33/458 |
| 4,566,200 A | 1/1986 | Brady et al. | |
| 4,955,141 A | 9/1990 | Welch | |
| 5,704,259 A | 1/1998 | Riehle | |
| 5,735,058 A | 4/1998 | Jimenez | |
| 5,833,224 A | 11/1998 | Holte | |

(Continued)

FOREIGN PATENT DOCUMENTS

EP     0448506     9/1991

OTHER PUBLICATIONS

Mirriam-Webster's Collegiate Dictionary, Tenth Edition, p. 554, copyright 1993.*

*Primary Examiner*—G. Bradley Bennett
(74) *Attorney, Agent, or Firm*—Coats & Bennett, P.L.L.C.

(57) ABSTRACT

A folding rule includes a plurality of segments having length indicating indicia thereon, including a plurality of intermediate segments having a length to thickness ratio in the range of 40:1 to 60:1; the segments pivotally connected together and pivotally moveable between a collapsed configuration wherein the segments are stacked and an extended configuration wherein the segments are linearly aligned along a measurement axis, wherein at least one intermediate segment rotates by approximately 180° with respect to an adjacent intermediate segment to move between the collapsed configuration and the extended configuration; the segments formed of a generally homogenous electrically non-conductive mixture of wood and plastic. The intermediate segments may be substantially identical except for the length indicating indicia thereon, and at least the intermediate segments may be hydrophobic and be formed of a generally homogenous mixture of wood and ABS plastic. A method of forming such folding rules is also disclosed.

18 Claims, 4 Drawing Sheets

U.S. PATENT DOCUMENTS

| | | |
|---|---|---|
| 6,061,920 A | 5/2000 | McMorrow |
| 6,418,631 B1 | 7/2002 | Ramsthaler |
| 6,526,712 B1 | 3/2003 | Brooks et al. |
| 6,851,201 B1 * | 2/2005 | Gioia et al. ............... 33/492 |
| 6,932,336 B1 * | 8/2005 | Nudo .................. 269/302.1 |
| 2003/0000096 A1 | 1/2003 | Wang |
| 2005/0271872 A1 * | 12/2005 | Dolinar .................. 428/323 |

* cited by examiner

US 7,111,408 B2

FOLDING RULE

BACKGROUND OF THE INVENTION

The present invention is directed generally to folding rules for measuring linear distances.

Folding rules, sometimes referred to as "carpenter's rules" or "wooden rules," have been known for some time. Such rules have an advantage over conventional retractable tape measures in that the folding rules are generally much more rigid than the tape blades of the tape measures. This rigidity allows for the folding rules to be used more easily for many tasks, particularly for carpenters that work with cabinetry and brick masons.

Typically, folding rules are made with a plurality of segments that are joined together by pivot joints to form a collapsible chain. The segments are typically formed of wood, and joints are typically metallic. However, conventional wooden rules are sometimes viewed as being less than ideal for environments with electrical hazards, such as in the electrical utility industry, due to the potential of the wood to absorb water and become electrically conductive. Separately, synthetic folding rules have recently been introduced, such those made from fiberglass and the like, that allow for manufacturing cost reductions due to the "molding-in" of various joint elements. While such synthetic folding rules have some advantages, they are disfavored by many consumers for various reasons.

Thus, while a number of folding rule designs exist, none have proven entirely satisfactory. As such, there remains a need for alternative folding rule designs.

SUMMARY OF THE INVENTION

The present invention is directed to folding rules that have at least intermediate segments, and advantageously all segments, formed of a generally homogenous electrically non-conductive mixture of wood and plastic but retain a length to thickness ratio in the range of 40:1 to 60:1. These segments are advantageously hydrophobic.

In one embodiment the present invention provides a folding rule comprising: a plurality of hydrophobic segments having length indicating indicia thereon, including a first end segment and second end segment and a plurality of intermediate segments, the hydrophobic segments formed of a generally homogenous electrically non-conductive mixture of wood and ABS plastic; the intermediate segments having a length to thickness ratio in the range of 40:1 to 60:1 and each of the intermediate segments comprising a first hole disposed toward a first end thereof and a second hole disposed toward a second opposite end thereof; the intermediate segments pivotally connected together at respective pivot joints via a plurality of posts each extending through the first hole of a first intermediate segment of the joint and the second hole of an adjacent intermediate segment of the joint; wherein the intermediate segments forming each pivot joint are biased toward one another; at least the intermediate segments pivotally moveable between a collapsed configuration wherein the intermediate segments are stacked and an extended configuration wherein the intermediate segments are linearly aligned along a measurement axis, wherein at least one intermediate segment rotates by approximately 180° with respect to an adjacent intermediate segment to move between the collapsed configuration and the extended configuration; the intermediate segments each further comprising a plurality of protrusions extending normal to the measurement axis and disposed proximate the first hole and a plurality of recesses extending normal to the measurement axis and disposed proximate the second hole; wherein the protrusions and the recesses are complementarily formed. The intermediate segments may be substantially identical except for the length indicating indicia thereon, may advantageously further comprise a plurality of the protrusions and the recesses disposed proximate to both the first hole and the second hole, and may have a length to thickness ratio of approximately 55:1. The resulting folding rule may be entirely non-metallic.

In another embodiment, the present invention provides a folding rule comprising: a plurality of segments having length indicating indicia thereon, including a first end segment and second end segment and a plurality of intermediate segments, at least the intermediate segments having a length to thickness ratio in the range of 40:1 to 60:1; the segments pivotally connected together and pivotally moveable between a collapsed configuration wherein the segments are stacked and an extended configuration wherein the segments are linearly aligned along a measurement axis, wherein at least one intermediate segment rotates by approximately 180° with respect to an adjacent intermediate segment to move between the collapsed configuration and the extended configuration; the segments formed of a generally homogenous electrically non-conductive mixture of wood and plastic. The segments may be pivotally connect together via a plurality of pivot joints having detents. The intermediate segments may each further comprise a first hole disposed toward a first end thereof and a second hole disposed toward a second opposite end thereof, with a plurality of posts each extending through the first hole of a first intermediate segment and the second hole of an adjacent intermediate segment. The intermediate segments may each further comprise a plurality of protrusions extending normal to the measurement axis and disposed proximate the first hole and a plurality of recesses extending normal to the measurement axis and disposed proximate the second hole, and these protrusions and recesses may advantageously be complementarily formed. The segments forming a joint may be urged together by a biasing element. The intermediate segments may be substantially identical except for the length indicating indicia thereon, and at least the intermediate segments, and advantageously all the segments, may be hydrophobic. The segments may be formed of a generally homogenous mixture of wood and ABS plastic. The folding rule may alternatively have a combination one or more of these features.

In another embodiment, the present invention provides a method of forming an electrically non-conductive folding rule comprising: providing a plurality of segments having length indicating indicia thereon and formed of a generally homogenous electrically non-conductive mixture of wood and plastic, including a first end segment and second end segment and a plurality of intermediate segments, at least the intermediate segments having a length to thickness ratio in the range of 40:1 to 60:1; pivotally connecting the first end segment to a first intermediate segment and pivotally connecting the second end segment to a second intermediate segment; pivotally connecting at least the intermediate segments together so that the intermediate segments are pivotally moveable between a collapsed configuration wherein the intermediate segments are stacked and an extended configuration wherein the intermediate segments are linearly aligned along a measurement axis, wherein at least one intermediate segment rotates by approximately 180° with respect to an adjacent intermediate segment to move between the collapsed configuration and the extended configuration. The providing a plurality of segments may comprise providing the plurality of segments formed of a generally homogenous mixture of wood and ABS plastic, wherein said segments are hydrophobic. The pivotally connecting at least the intermediate segments together may comprise pivotally connecting at least the intermediate segments together via a plurality of pivot joints having detents, and wherein the intermediate segments forming each pivot joint are biased toward one another.

DETAILED DESCRIPTION OF THE INVENTION

Figure 1:
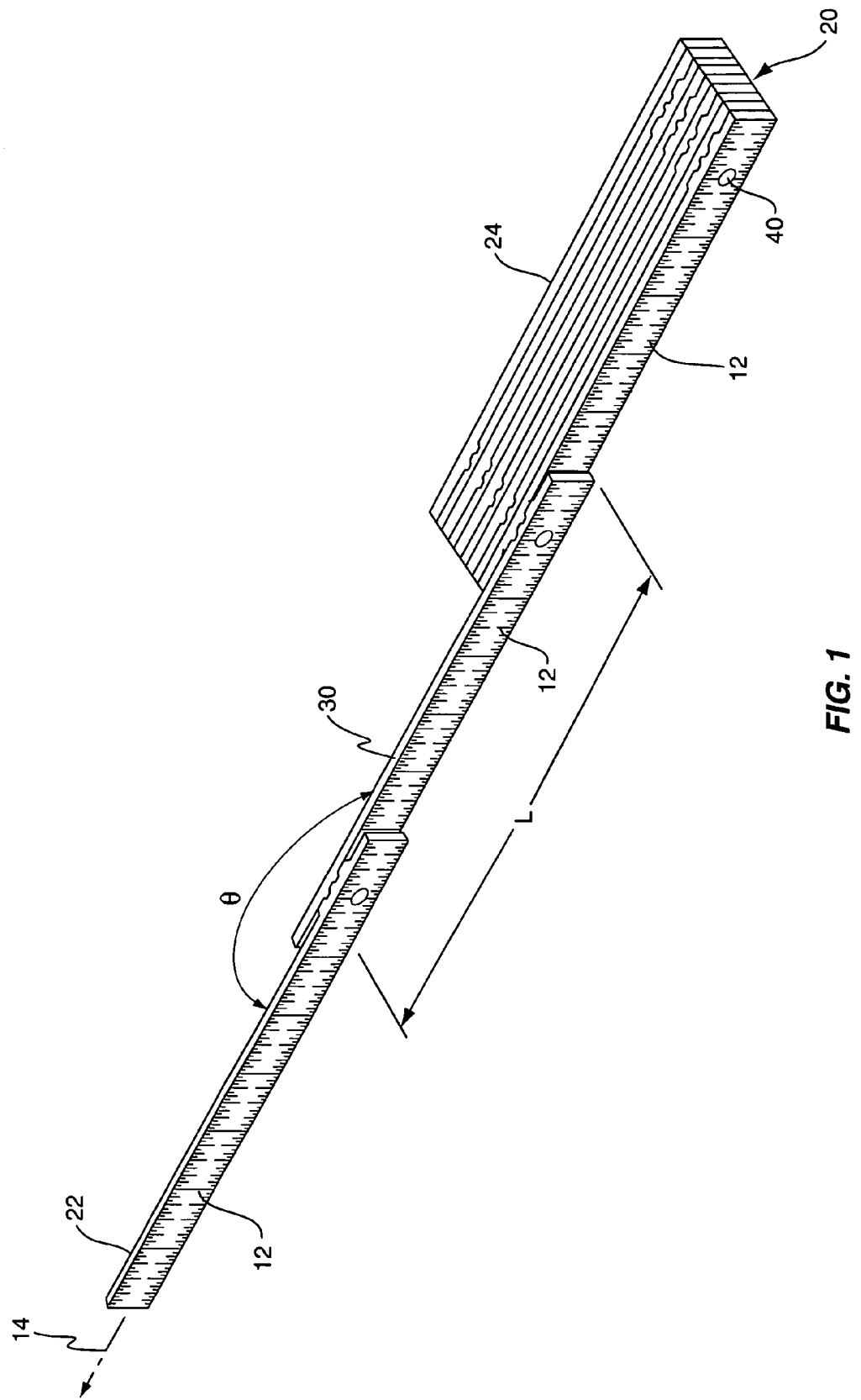
FIG. 1 shows a folding rule in accordance with one embodiment of the present invention.
Figure 2:
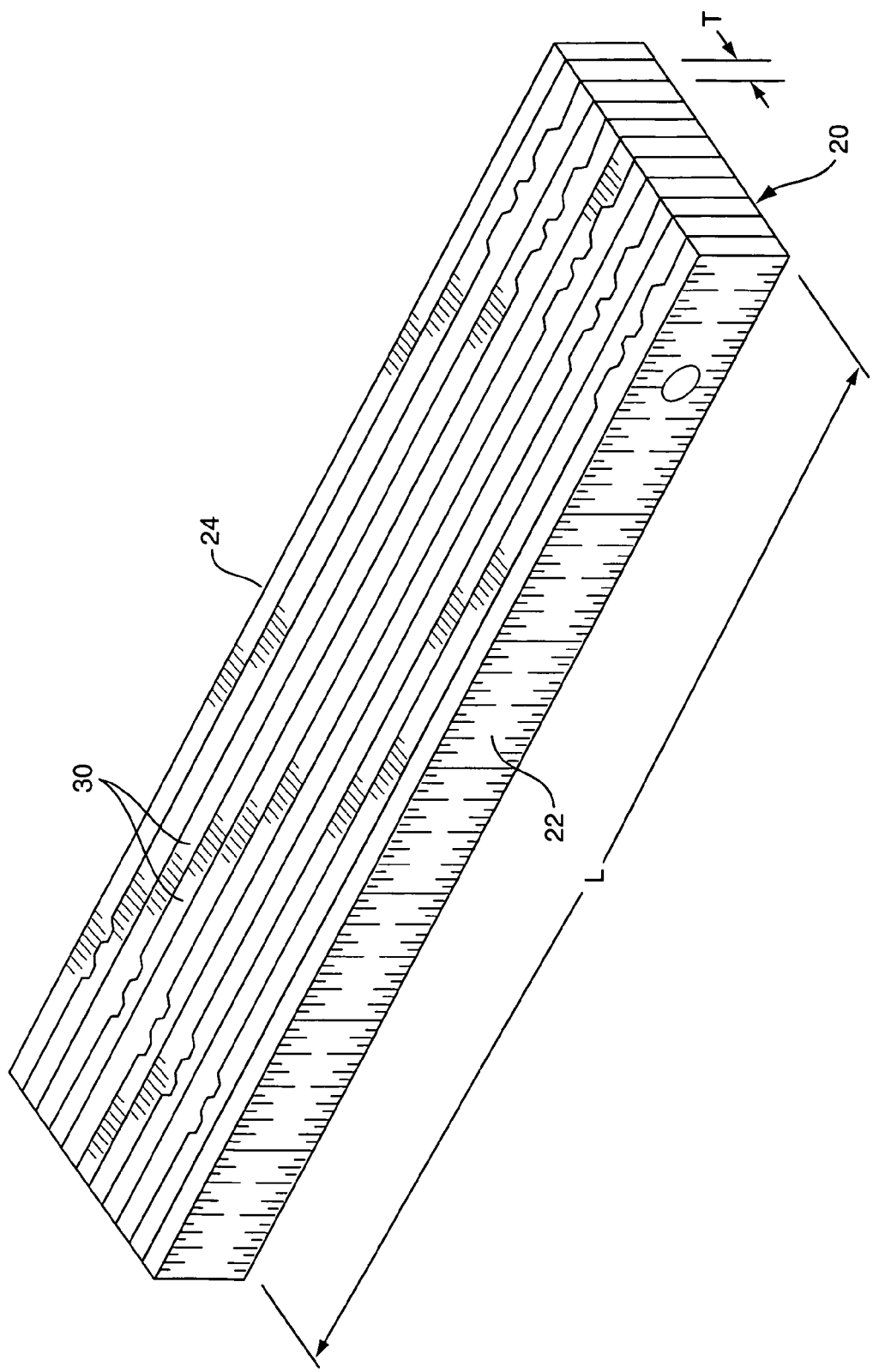
FIG. 2 shows the folding rule of FIG. 1 in the stacked configuration.
Figure 3:
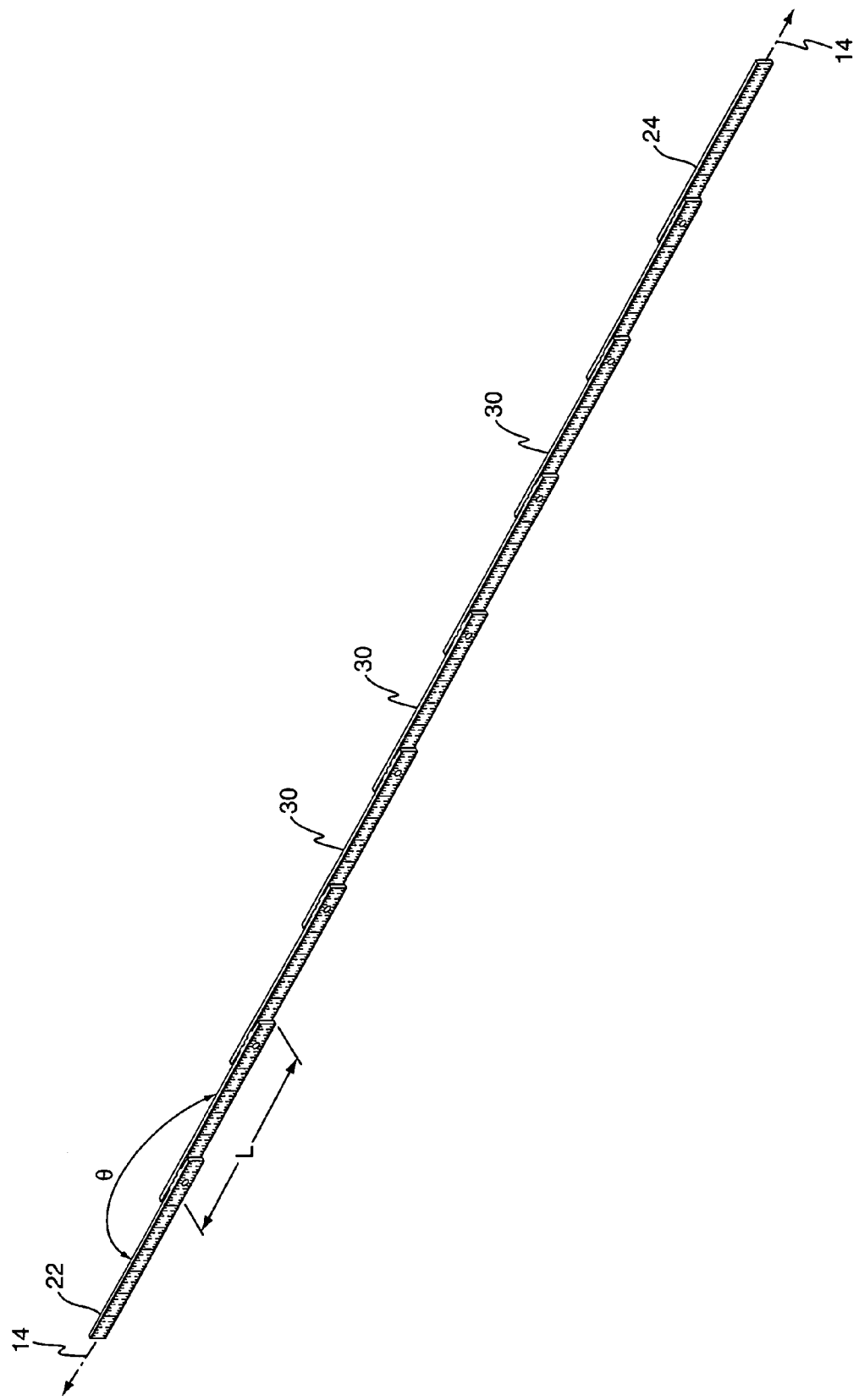
FIG. 3 shows the folding rule of FIG. 1 in the extended configuration.
Figure 4:
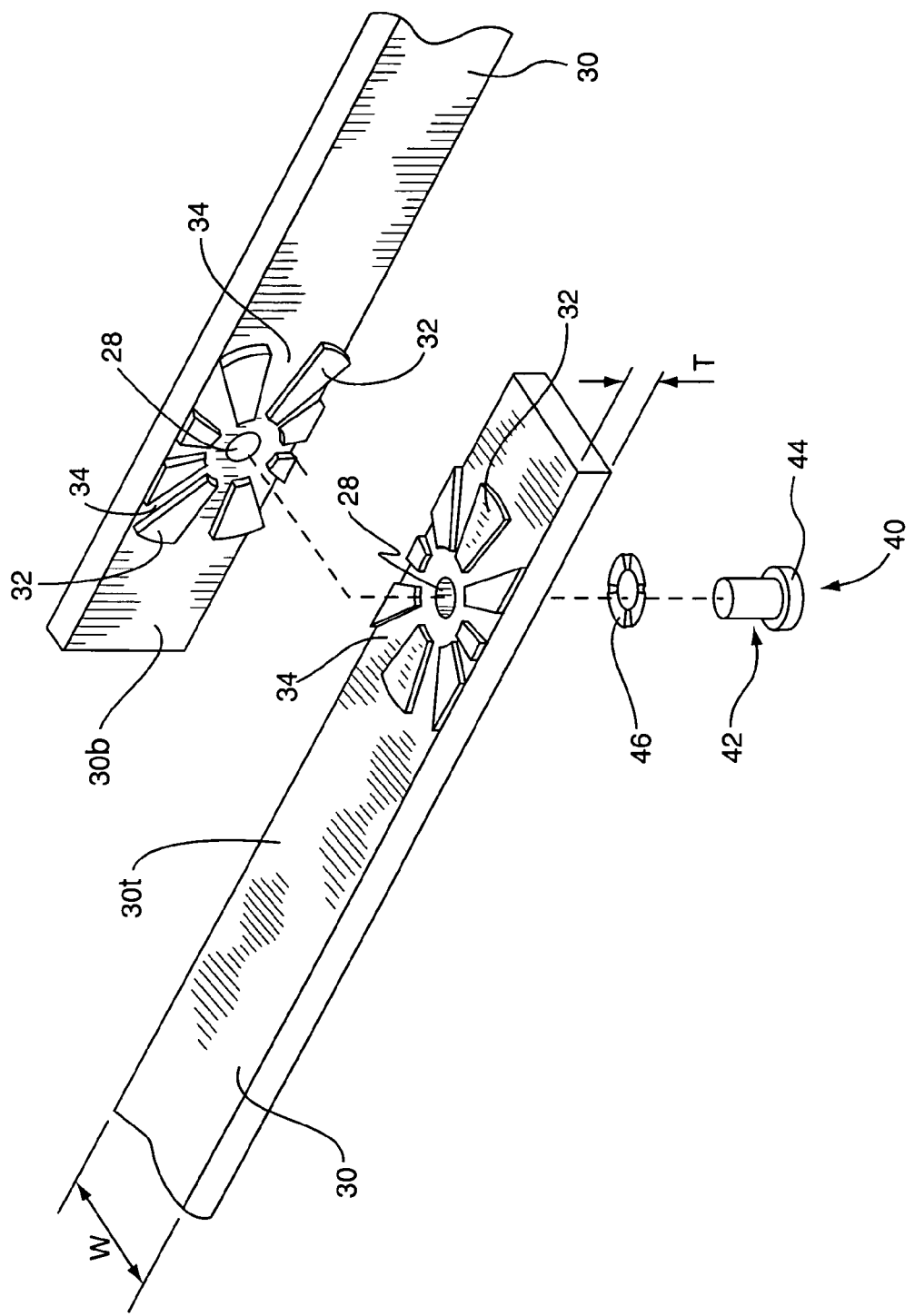
FIG. 4 shows a post connecting together a pair of intermediate segments.

As illustrated in FIG. 1, a folding rule, generally designated 10, is shown constructed according to the present invention. As is conventional, the folding rule 10 includes a number of segments 20 that are pivotally connected together by pivot joints 40. The pivoting action of the segments 20 allows the folding rule 10 to assume a collapsed or stacked configuration for storage, and an extended configuration suitable for taking measurements along a measurement axis 14. For ease of reference, the segments 20 may be thought of as a first end segment 22, a second end segment 24 opposite the first end segment 22, and a plurality of intermediate segments 30. The segments 20 have length indicating indicia 12 thereon, such as inches, centimeters, or any other useful linear distance scale known in the art. Advantageously, length indicating indicia 12 are present on both sides of the segments 20, with the respective scales incrementing in opposite directions.

Advantageously, the various intermediate segments 30 are identical except for their respective length indicating indicia 12. Each intermediate segment 30 has a length L and a thickness T and a width W. Preferably, the intermediate segments 30 have a length to thickness ratio in the range of 40:1 to 60:1, and advantageously approximately 55:1, and a length to width ratio in the range of 8:1 to 15:1, and advantageously approximately 12:1. Such a configuration is chosen so as to provide the intermediate segments 30 with suitable rigidity so that the folding rule 10 may be self supporting across relatively long distances in the extended configuration, but not be too bulky when in the stacked configuration. It is intended that each intermediate segment 30 be connected to the relevant adjacent segment 20 so that it may be rotated with respect thereto across an angle θ of 180°, and advantageously a full 360°. To facilitate this, the intermediate segments 30 may advantageously include connection holes 28 disposed toward respective ends of the segment 30 for accepting the pivot posts 42 discussed below.

Further, for providing detent action, each segment 30 may advantageously include a plurality of protrusions 32 and recesses 34, disposed in sets proximate each of the holes 28. In such an arrangement, protrusions 32 on the bottom surface 30b of one intermediate segment 30 inter-engage with the complimentarily formed recesses 34 on the top surface 30t of the adjacent intermediate segment 30 to rotationally interlock the segments 30 with respect to each other at one or more predetermined angles. Examples of suitable arrangement of protrusions 32 and recesses 34 are shown in U.S. Patent Application Publication 2003/0000096, which is incorporated herein by reference. Alternatively, the segments 30 may top surfaces 30t with only protrusions 32 formed near one hole 28, with the bottom surfaces 30b having only corresponding recesses 34 formed near the other hole 28, but such an arrangement may complicate fabrication of the folding rule 10. In another alternative, the top surface 30t of segment 30 may have only protrusions 32 formed near hole 28 on one end, with only recesses 34 near hole 28 on the opposite end, and the inverse arrangement on the bottom surfaces 30b. Whatever the arrangement, the protrusions 32 and recesses 34 may advantageously be molded into the segments 30 when they are formed, thereby reducing manufacturing costs.

The end segments 22, 24 may advantageously be substantially the same as the intermediate segments 30, but with only one connection hole 28 and corresponding protrusions 32 and recesses 34, all located toward the end closest to the intermediate segments 30. Alternatively, one or both of the end segments 22,24 may be shorter than the intermediate segments 30 and/or may include a so-called sliding caliper, such as those shown in U.S. Pat. Nos. 2,642,667; 1,998,018, 1,978,887; 1,432,834; and 1,460,784, all of which are incorporated herein by reference.

Rather than being made entirely of wood, or made entirely of plastic, the segments 20 of the folding rule 10 of the present invention are formed of a generally homogenous mixture of plastic and wood. Advantageously, the segments 20 are formed of a generally homogeneous mixture of acrylonitrile-butadiene-styrene (ABS) and wood fibers. Such a material mixture is electrically non-conductive and resistant to water absorption, which allows the folding rules 10 of the present invention to be more readily used in environments where electrical conductivity is a concern (e.g., in the electrical utility industry). However, the inclusion of wood in the material is believed to enhance the consumer acceptance of the new material. In order to increase consumer acceptance, the segments 20 may advantageously have a wood-like appearance and be of a color typically seen in natural wood (e.g., brown, tan, etc.). By way of non-limiting example, some suitable materials that are mixtures of ABS and wood fibers are sold under the trade names "Diamaloy SW2015B" and/or "Diamaloy SW3015B," available from Diamond Polymers, Inc. of Akron, Ohio. In some embodiments, it may be advantageous to add a chemical foaming agent to the material during extrusion or other molding of the segments 20, such as the chemical foaming agent sold under the trade name "Foamazol 91," available from Bergen International of Rochelle Park, N.J.

As mentioned above, the various segments 30 are pivotally inter-connected so that, advantageously, each segment 30 may move through at least an 180° angle θ with respect to the adjacent segments 30. A plurality of pivot joints 40 inter-connect adjacent segments 30. The pivot joints 40 (or coupling means) include pivot posts 42 that extend through two holes 28, one in each of the two segments 30 being joined together. As shown, each post 42 may advantageously include an expanded head 44 on one end to help keep the two segments 30 together. If desired, a suitable biasing element 46 may help urge one segment 30 against the adjacent segment 30 by acting on the post 42. Indeed, in some embodiments, the biasing element 46 takes the form of a short spring rod (not shown), with the spring rod extending laterally through the post 42 distally from the head 44 so as to capture the two segments 30 between the head 44 and the spring rod. See U.S. Pat. No. 3,490,148, which is incorporated herein by reference, for a fuller discussion of such an arrangement. It should noted that while the pivot joints 40 above has been in terms of pivot joints 40 with detent similar to that shown in U.S. Pat. No. 3,490,148 and/or U.S. Patent Application Publication 2003/0000096, such pivot joints 40 are not required in all embodiments. Different pivot joints 40 known to those of skill in the art, such as the boss and countersunk head arrangement of U.S. Pat. No. 3,289,302 and/or the clip-type hinges of U.S. Pat. No. 1,978,867, each of which are incorporated herein by reference, may alternatively be employed. The pivot joints 40 may include metallic members, although it is believed to be advantageous if most, if not all, of the elements of the pivot joints 40 are non-metallic so as to be electrically non-conductive. As such, the pivot posts 42 may be integrally formed with a corresponding segment 20 if desired, although the pivot joint 40 is conceptually considered as being separate from the segments 20.

One embodiment of the folding rule 10 may be formed by providing a first end segment 22, and second end segment 24, and a plurality of intermediate segments 30, all as generally described above. The first end segment 22 is pivotally connected to a first intermediate segment 30, and the second end segment 24 is pivotally connected to another intermediate segment 30. The various intermediate segments 30 are also pivotally connected together so that at least the intermediate segments 30 are pivotally moveable between the collapsed and extended configurations discussed above. Any one of the various pivot joints 40 discussed above may be employed to pivotally connect the segments 20. It should be noted that the sequence of connecting the first end segment 22 to its intermediate segment 30, the second end segment 24 to its intermediate segment 30, and the between the various intermediate segments 30, may be carried out in any convenient order. The resulting folding rule 10 is then packaged in suitable packaging, if desired, for display at a point of sale and/or shipment.

As pointed out above, the segments 20 of the folding rule 10 of the present invention are formed of a generally homogenous mixture of plastic and wood. In some embodiments of the present invention, it may be that different sections of a given segment 20 are colored differently, such as being formed of differently colored base materials. However, it should be noted that the inclusion of different coloring agents is not, within the meaning of the present invention, sufficient to cause such a segment to be considered as being formed of a non-homogeneous mixture. Thus, the focus of the homogeneity of a segment 20 for the present invention, and the claim language of "segments formed of a generally homogeneous mixture of A and B," and the like, is the distribution of the relevant components A (e.g., plastic) and B (e.g., wood) in the segment 20. Likewise, the length indicia 12 may be formed when the main portion of the segment 20 is formed, or may added later, and the addition of ink and/or paint for the length indicia 12 is not considered to affect the homogeneity of the segment 20.

The present invention may, of course, be carried out in other specific ways than those herein set forth without departing from the essential characteristics of the invention. The present embodiments are, therefore, to be considered in all respects as illustrative and not restrictive, and all changes coming within the meaning and equivalency range of the appended claims are intended to be embraced therein.

What is claimed is:

1. A folding rule, comprising:
   a plurality of hydrophobic segments having length indicating indicia thereon, including a first end segment and second end segment and a plurality of intermediate segments, the hydrophobic segments formed of a generally homogenous electrically non-conductive mixture of wood and ABS plastic;
   the intermediate segments having a length to thickness ratio in the range of 40:1 to 60:1 and each of the intermediate segments comprising a first hole disposed toward a first end thereof and a second hole disposed toward a second opposite end thereof;
   the intermediate segments pivotally connected together at respective pivot joints via a plurality of posts each extending through the first hole of a first intermediate segment of the joint and the second hole of an adjacent intermediate segment of the joint; wherein the intermediate segments forming each pivot joint are biased toward one another;
   at least the intermediate segments pivotally moveable between a collapsed configuration wherein the intermediate segments are stacked and an extended configuration wherein the intermediate segments are linearly aligned along a measurement axis, wherein at least one intermediate segment rotates by approximately 180° with respect to an adjacent intermediate segment to move between the collapsed configuration and the extended configuration;
   the intermediate segments each further comprising a plurality of protrusions extending normal to the measurement axis and disposed proximate the first hole and a plurality of recesses extending normal to the measurement axis and disposed proximate the second hole; wherein the protrusions and the recesses are complementarily formed.

2. The folding rule of claim 1 wherein the intermediate segments are substantially identical except for the length indicating indicia thereon.

3. The folding rule of claim 1 wherein the intermediate segments each further comprising a plurality of the protrusions and the recesses disposed proximate to both the first hole and the second hole.

4. The folding rule of claim 1 wherein the folding rule is entirely non-metallic.

5. The folding rule of claim 1 wherein the intermediate segments have a length to thickness ratio of approximately 55:1.

6. A folding rule, comprising:
   a plurality of segments having length indicating indicia thereon, including a first end segment and second end segment and a plurality of intermediate segments, at least the intermediate segments having a length to thickness ratio in the range of 40:1 to 60:1;
   the segments pivotally connected together and pivotally moveable between a collapsed configuration wherein the segments are stacked and an extended configuration wherein the segments are linearly aligned along a measurement axis, wherein at least one intermediate segment rotates by approximately 180° with respect to an adjacent intermediate segment to move between the collapsed configuration and the extended configuration;
   the segments formed of a generally homogenous electrically non-conductive mixture of wood and plastic.

7. The folding rule of claim 6 wherein the segments pivotally connect together via a plurality of pivot joints having detents.

8. The folding rule of claim 6 wherein the intermediate segments each further comprise a first hole disposed toward a first end thereof and a second hole disposed toward a second opposite end thereof, and further comprising a plurality of posts each extending through the first hole of a first intermediate segment and the second hole of an adjacent intermediate segment.

9. The folding rule of claim 8 wherein the intermediate segments each further comprise a plurality of protrusions extending normal to the measurement axis and disposed proximate the first hole and a plurality of recesses extending normal to the measurement axis and disposed proximate the second hole.

10. The folding rule of claim 9 wherein the protrusions and the recesses are complementarily formed.

11. The folding rule of claim 8 wherein the segments forming a joint are urged together by a biasing element.

12. The folding rule of claim 6 wherein the intermediate segments are substantially identical except for the length indicating indicia thereon.

13. The folding rule of claim 6 wherein the segments are hydrophobic.

14. The folding rule of claim 6 wherein the segments are formed of a generally homogenous mixture of wood and ABS plastic.

15. The folding rule of claim 6:
wherein the intermediate segments each further comprise a first hole disposed toward a first end thereof and a second hole disposed toward a second opposite end thereof, and further comprising a plurality of posts each extending through the first hole of a first intermediate segment and the second hole of an adjacent intermediate segment;
wherein the intermediate segments each further comprise a plurality of protrusions extending normal to the measurement axis and disposed proximate the first hole and a plurality of recesses extending normal to the measurement axis and disposed proximate the second hole;
wherein the protrusions and the recesses are complementarily formed;
wherein the segments forming a joint are urged together by a biasing element;
wherein the intermediate segments are substantially identical except for the length indicating indicia thereon;
wherein the segments are formed of a generally homogenous mixture of wood and ABS plastic and are hydrophobic.

16. A method of forming an electrically non-conductive folding rule, comprising:
providing a plurality of segments having length indicating indicia thereon and formed of a generally homogenous electrically non-conductive mixture of wood and plastic, including a first end segment and second end segment and a plurality of intermediate segments, at least the intermediate segments having a length to thickness ratio in the range of 40:1 to 60:1;
pivotally connecting the first end segment to a first intermediate segment and pivotally connecting the second end segment to a second intermediate segment;
pivotally connecting at least the intermediate segments together so that the intermediate segments are pivotally moveable between a collapsed configuration wherein the intermediate segments are stacked and an extended configuration wherein the intermediate segments are linearly aligned along a measurement axis, wherein at least one intermediate segment rotates by approximately 180° with respect to an adjacent intermediate segment to move between the collapsed configuration and the extended configuration.

17. The method of claim 16 wherein pivotally connecting at least the intermediate segments together comprises pivotally connecting at least the intermediate segments together via a plurality of pivot joints having detents, and wherein the intermediate segments forming each pivot joint are biased toward one another.

18. The method of claim 16 wherein providing a plurality of segments comprises providing the plurality of segments formed of a generally homogenous mixture of wood and ABS plastic, wherein said segments are hydrophobic.

* * * * *